F. ZARTH.
MACHINE FOR DIVIDING DOUGH AND OTHER SOFT MATERIALS.
APPLICATION FILED AUG. 23, 1910.
983,595.
Patented Feb. 7, 1911.
3 SHEETS—SHEET 2.
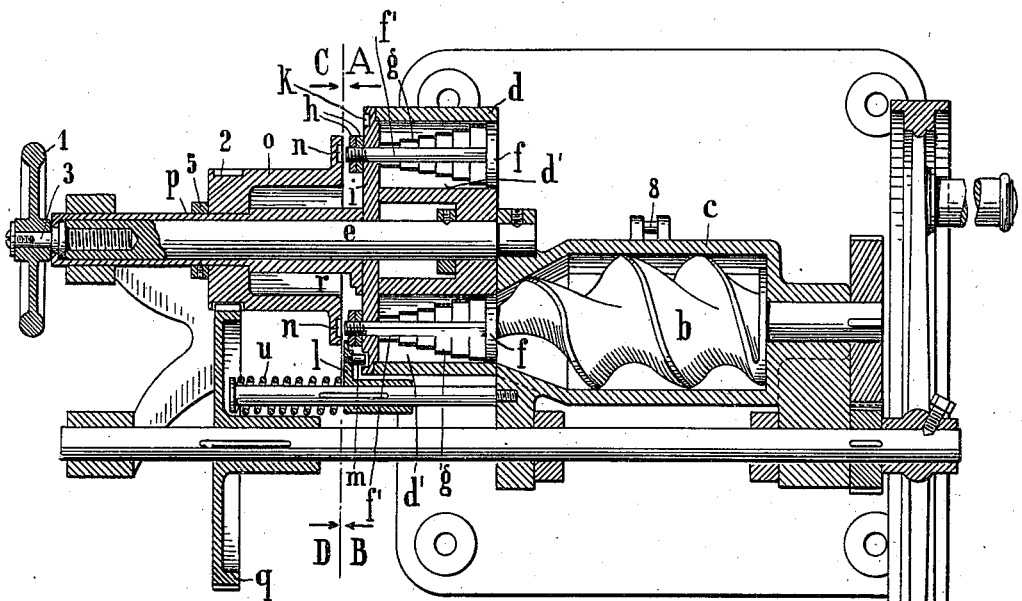
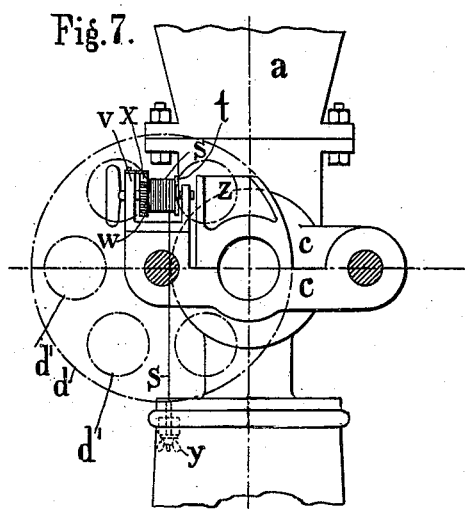
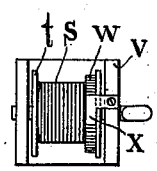

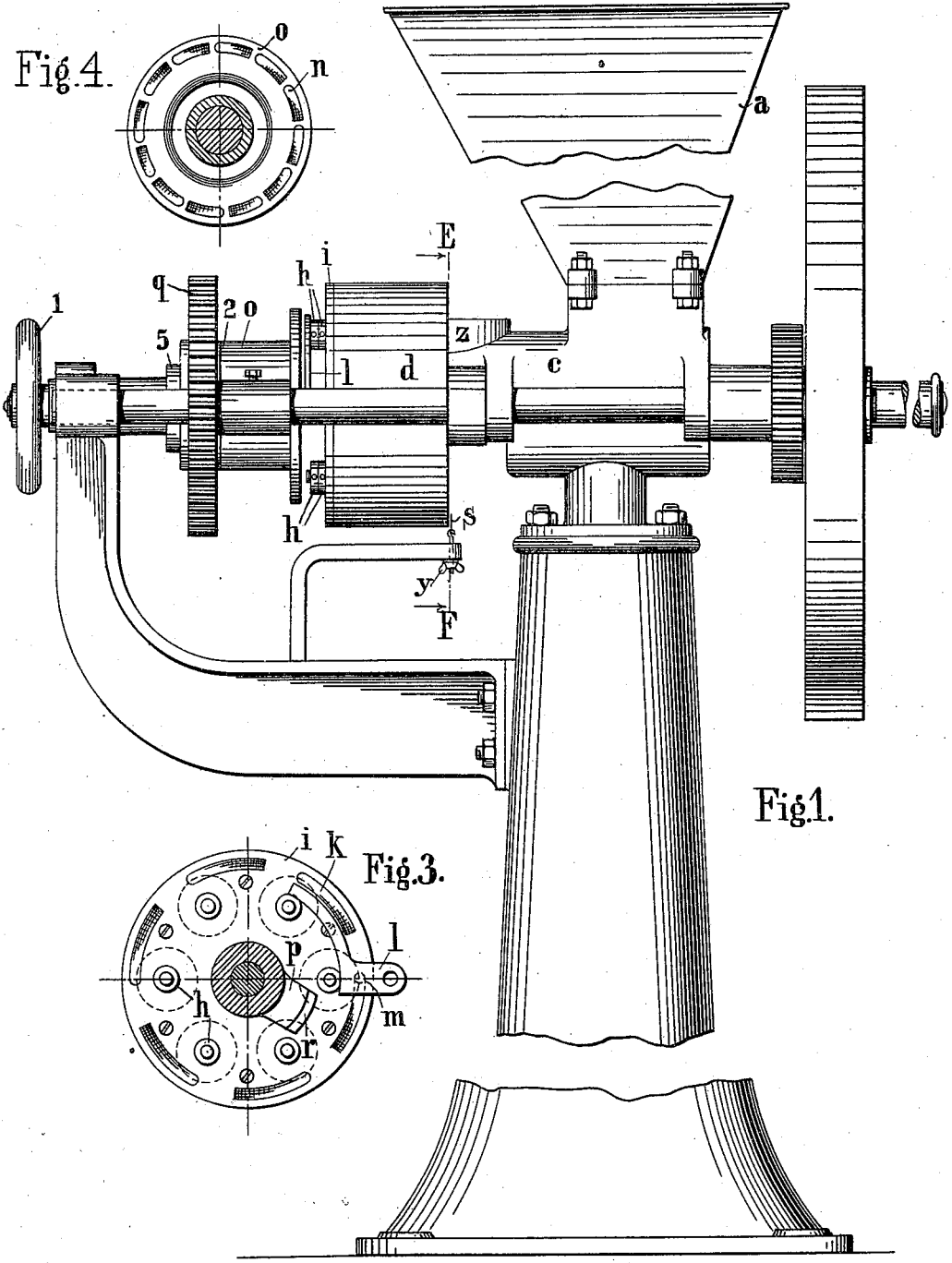

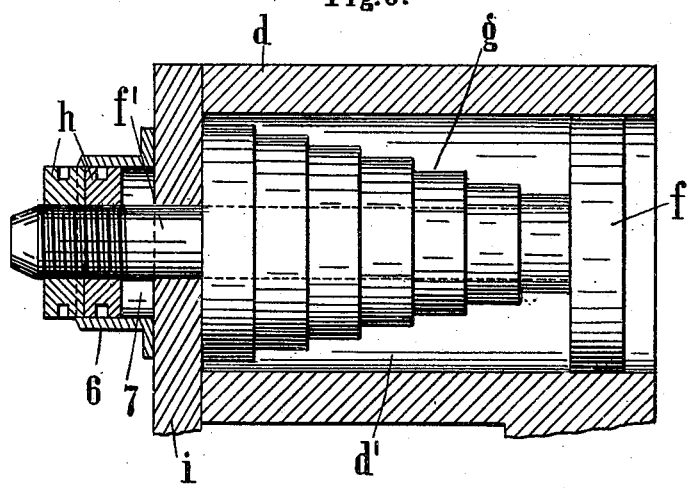
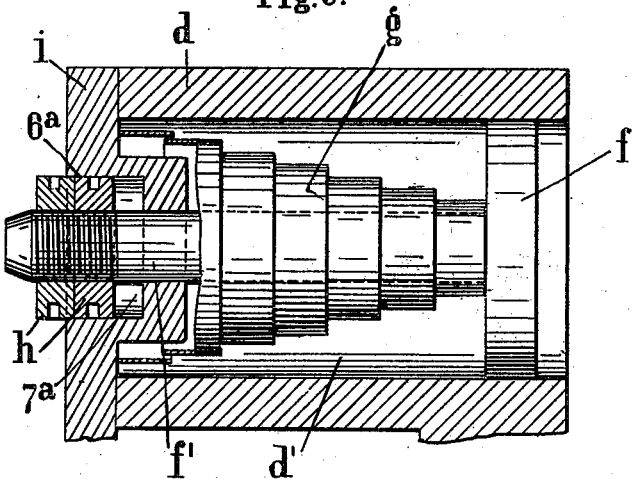

UNITED STATES PATENT OFFICE.

FRANZ ZARTH, OF MALLMITZ, GERMANY.

MACHINE FOR DIVIDING DOUGH AND OTHER SOFT MATERIALS.

983,595.  Specification of Letters Patent.  Patented Feb. 7, 1911.

Application filed August 23, 1910. Serial No. 578,527.

*To all whom it may concern:*

Be it known that I, FRANZ ZARTH, a subject of the German Emperor, and resident of Mallmitz, Silesia, German Empire, have invented new and useful Improvements in Machines for Dividing Dough and other Soft Materials, of which the following is a full, clear, and exact specification.

This invention relates to machines for dividing dough and other soft materials, and more especially to those machines of this class which are provided with a worm for feeding the material and with a rotatable set of dividing chambers arranged within, or forming part of, a rotatable drum.

One of the objects of this invention is to provide improved means whereby the dough or other material to be divided is caused to remain in the various dividing chambers of the rotatable drum or set, while they are being rotated, and to be discharged therefrom only after the respective individual chambers have arrived in the most favorable position for discharge, so as to thereby avoid deformation of the bodies of material discharged.

Other objects of the invention are, to provide improved means for adjusting the size of the bodies of dough or other material at will while the machine is in operation, and for readily varying the pressure on the material by the mere exchange of certain springs.

The invention consists in the particular arrangement and combination of parts hereinafter referred to and shown in the accompanying drawings.

Figure 1 is a side elevation of a hand-operated machine embodying this invention, certain parts being shown broken. Fig. 2 is a horizontal section on a line passing through the level of the main shaft, the latter and certain other elements, however, being shown partly in plan. Fig. 3 is a vertical section on the line A—B in Fig. 2, as seen from the left to the right in Fig. 2, with parts omitted. Fig. 4 is a vertical section of a part of the machine on the line C—D in Fig. 2, as seen from the right to the left in Fig. 2. Figs. 5 and 6 are a side elevation and a plan, respectively, of a detail to be referred to. Fig. 7 is a more or less diagrammatic transverse sectional view on the line E—F in Fig. 1, with certain parts shown in elevation and others omitted or partly broken away. Fig. 8 shows a detail in section. Fig. 9 shows a modification of the part of Fig. 8 in section.

The machine as shown in the drawings is mounted on a suitable standard and is provided with a hopper in the shape of a chute $a$ on top of a casing $c$, the latter containing a worm $b$ adapted to be rotated by the intermediation of gears or their equivalents from any suitable driving means, such as the hand-wheel shown or by power transmission. The worm $b$ may either, as shown in the drawing, extend up to immediately in front of the dividing chambers, or a free space may be left between the end of the worm and the inlet opening of the pressure chambers. A drum $d$ mounted to rotate freely on a rigid axis $e$ contains a number of chambers $d'$, six being shown in the drawing, although in other cases a smaller or larger number may be provided as desired. In each of these chambers is mounted a piston $f$ (Fig. 2) and a spring $g$ acts to maintain each piston with its outer face exactly in the plane of the corresponding outer end surface of the drum $d$. At the opposite end of each chamber $d'$ the rod $f'$ of its piston extends through an opening in the end plate $i$ of the drum $d$ and is there secured by two nuts $h$ in such a manner that the piston will be free to move backward, but will be prevented from moving forward beyond the end surface of the drum.

An actuating disk $o$, having a lateral extension in the manner of a hollow cylindrical hub portion (Fig. 2), is rotated from the main driving elements of the machine by the engagement of a gear $q$ with a circumferential set of gear teeth $2$ provided on the hub portion of the said actuating disk $o$, and the latter is formed on its face with an annular set of cam grooves $n$ (Figs. 2 and 4) adapted to act on the ends of the piston rods $f'$. A retaining segment $l$ acted upon by a spring $u$ is rigidly mounted on a stationary part of the machine (Figs. 2 and 3) and carries a pin or projection $m$ which engages with cam grooves $k$ formed on the end plate $i$ of the drum $d$, as shown in Fig. 3. At the same time the segment $l$ extends somewhat above, and out of contact with, the securing nuts $h$.

A hand-wheel 1 is mounted on a spindle 3, and the latter carries the sleeve $p$ on which the actuating disk $o$ is mounted. 2 designates the gear teeth on the hollow hub portion of the said disk, and 5 is an adjusting ring or collar.

$s$ is a cutting-off wire wound on a drum $t$ (Figs. 5, 6 and 7), $v$ is a standard in which the said drum is journaled, $x$ is a spring retaining pawl engaging a toothed wheel $w$, $y$ is a tension-adjusting screw, $z$ is a receiver for dusting material, such as flour or the like, and 8 is a contrivance for connecting the sections of the assembled casing $c$.

The mass of dough or other material to be divided having been introduced into the hopper or chute $a$ the operator starts the machine. The worm $b$ in the casing $c$ then presses the material toward the drum $d$. The end of the worm $b$ and also the casing $c$ are, preferably, formed conically toward the discharge opening, so as to cause the material to become thoroughly agitated and mixed under the action of the pressure thereby set up. The material while being acted on by the worm presses the piston $f$ back and enters the dividing chamber $d'$. The piston rod $f'$ is thereby moved in the direction toward the actuating disk $o$ until its end enters the respective cam groove $n$ of the said disk, thereby terminating the movement of the piston. By turning the hand-wheel 1 the actuating disk may be adjusted in a position nearer to or farther away from the drum $d$, as desired, to thereby regulate the length of stroke of the piston $f$. According to the length of stroke thereby allowed the piston the quantity of dough or other material pressed into the chamber will be varied, so that any desired size of bodies of material may be obtained by simply turning the hand-wheel 1 to the proper extent in the direction required.

The retaining segment $l$ is so pressed against the end plate $i$ by the spring $u$ that the pin or projection $m$ on the said segment will in the position of rest engage in one of the cam grooves $k$ (Figs. 2 and 3). But on the piston rod $f'$ with the nuts $h$ thereon being pressed against the actuating disk $o$, the said nuts $h$ will exert a pressure on the retaining segment $l$ and thereby disengage the pin or projection $m$ from its coöperating cam groove $k$, so that the drum $d$ will then be free to rotate. During the operation of the machine the disk $o$ is kept continually rotating by the gear $q$; the said disk will therefore, when any one of the piston rods $f'$ enters a corresponding cam groove $n$, carry the drum $d$ along with it and will, by reason of the particular shape and length of the cam grooves $k$ (Fig. 3), rotate the said drum to such an extent as to cause the next adjoining chamber $d'$ to arrive in position in front of the discharge opening of the casing $c$.

In order to prevent the piston from being prematurely moved back by the pressure of its spring and thereby interfering with the rotation of the drum toward the next opening on the end of the piston rod leaving the cam groove of the actuating disk $o$, the sleeve $p$ is mounted to slide and carries a retaining arm $r$ (Figs. 2 and 3). Thus, as soon as the drum $d$ has performed a small part of its rotary movement the securing nut $h$ will engage behind the said retaining arm $r$ of the sleeve $p$, and the piston rod will therefore not be able to move back again until it has passed beyond the said retaining arm, and this will only be the case when the next chamber of the drum $d$ will have arrived in position in front of the discharge opening of the casing $c$. The piston will then be free again and will be returned to its initial position by the spring $g$. In this manner one chamber after the other will become filled with material by the action of the worm $b$, the drum rotated and the contents of the chamber discharged, on release of the nut $h$ from the retaining arm $r$, to be then cleanly cut off by the wire $s$.

In order to prevent excessive adhesion of certain materials a small chamber $z$ is provided which may be filled with flour or any other suitable substance that will prevent sticking. While the drum is being rotated suitable quantities of this substance will enter the chambers and will thus form a separating layer between the mass of material, the drum and the pistons.

The position of the cutting off wire is shown in Fig. 7. As will be seen there, the said wire is so arranged that it will during the rotary movement of the drum cleanly cut off the preceding body of material, provided that the latter does not of itself become fully detached. The wire drum $v$ $t$ $w$ is mounted on the casing $c$. The latter is provided with a small groove on that side on which the wire extends downward, and the wire rests in this groove, so that the drum may lie in close proximity to the casing.

The springs $g$ of the pistons $f$ are readily exchangeable. By the proper choice of springs suitably assorted in regard to various strengths it is possible to regulate the pressure to be applied to the dough or other material in accordance with the requirements of each case.

When it is desired to deaden the noise caused by the impact of the nuts $h$ against the end plate $i$ of the drum in the return movement of the piston rods $f'$ washers of rubber or other suitable material may be applied. Air cushions may also be applied instead, which will cause the machine to operate almost without any noise whatever and which possess the advantage of great durability. Fig. 8 shows an air buffer arrangement of this kind. In the return movement of the piston rods $f'$ the nuts $h$ will act to compress the air volume 7 contained within the buffer socket 6 and will allow the same to gradually escape again through the clearance spaces in the piston guideways or through a small opening specially provided for the purpose. This will prevent sudden impacts and shocks. Fig. 9 shows a similar arrangement with the air chamber $7^a$ situated inside the dough chamber $g'$. The walls of the air buffer chamber $6^a$ may be formed by the plate $i$, suitably adapted.

Material advantages of this invention, as compared with other machines of this class heretofore known or used, consist in that the dough or other material to be divided is caused to remain in the dividing chambers while these are being rotated and becomes discharged therefrom only after the respective chamber has arrived in the position most favorable for such discharge, so that deformation of the discharged body of material will be avoided; also in that the size of the bodies of material may be conveniently and efficiently adjusted at will while the machine is in operation, and in that the pressure on the material may be readily varied by the mere exchange of springs.

In small machines the retaining device $u$ $l$ may be dispensed with, if desired, but in larger machines it will be found advantageous to retain the same.

What I claim as my invention and desire to protect by Letters Patent is:—

1. In a dividing machine for dough and other materials the combination of a rotatable chambered drum, means for rotating the same, pistons operating in said drum, and piston rods extending therefrom adapted to engage the said rotating means to effect the rotation of said drum, substantially as described.

2. In a dividing machine for dough and other materials the combination of a rotatable chambered drum, pistons operating in the drum chambers, an actuating disk for rotating said drum, and piston rods extending from said pistons adapted to engage said actuating disk to effect the rotation of the said drum, substantially as described.

3. In a dividing machine for dough and other materials the combination of a rotatable chambered drum, pistons operating therein, a rotating actuating disk provided with cam recesses, and piston rods extending from said pistons and adapted to engage the cam recesses of said disk, upon the inward movement of said pistons, to effect the rotation of said drum, substantially as described.

4. In a dividing machine for dough and other materials the combination of a rotatable chambered drum, pistons operating in the drum-chambers, an actuating disk for said drum, and means to continuously rotate the same, piston rods extending from said pistons beyond said drum chambers and adapted to engage the said disk on completion of the desired filling of the drum-chambers with material, substantially as described.

5. In a dividing machine for dough and other materials the combination of a rotatable set of chambers, pistons coöperating therewith, an actuating disk adjustable toward and away from said chambers, means to continuously rotate the same and piston rods extending from said pistons and adapted to engage said disk on completion of the desired filling of said chambers with material, substantially as described.

6. In a dividing machine for dough and other materials the combination of a rotatable set of chambers, pistons coöperating with said chambers, an actuating disk, adjustable toward and away from said chambers, means to continuously rotate the same piston rods extending from said pistons and adapted to engage said disk on completion of the desired filling of said chambers with material, and a locking mechanism, substantially as described.

7. In a dividing machine for dough and other materials the combination of a rotatable set of chambers, pistons coöperating therewith, an actuating disk adjustable toward and away from said chambers, means to continuously rotate the same piston rods extending from said pistons and adapted to engage said disk on completion of the desired filling of the said chambers with material, and an arm and a projection thereon, said arm being adapted, in the filling position of a chamber and in the inactive position of its piston, to lock the said chamber against movement by the engagement of said projection with a cam recess, and being further adapted, on completion of the desired filling of said chamber with material to release the said chamber by the disengagement of the said projection from the said recess, substantially as described.

8. In a dividing machine for dough and other materials the combination of a drum, pistons coöperating therewith, an actuating disk capable of being brought into engagement with the extensions of the piston rods, and an air-buffer socket in which nuts $h$ on the said piston rods operate, substantially as described.

9. In a dividing machine for dough and other materials the combination of a drum, pistons coöperating therewith, an actuating disk capable of being brought into engagement with the extensions of the piston rods, and an air buffer socket recessed into the rear face of the drum and in which nuts $h$ on the said piston rods operate, substantially as described.

In testimony, that I claim the foregoing as my invention, I have signed my name in presence of two subscribing witnesses.

FRANZ ZARTH.

Witnesses:
 HENRY HASPER,
 WOLDEMAR HAUPT.